United States Patent
Nobori et al.

(10) Patent No.: US 6,762,259 B2
(45) Date of Patent: Jul. 13, 2004

(54) PROCESS FOR THE PRODUCTION OF LIVING (CO)POLYMERS AND USE OF THE (CO)POLYMERS

(75) Inventors: Tadahito Nobori, Sodegaura (JP); Katsuhiko Funaki, Sodegaura (JP); Atsushi Shibahara, Sodegaura (JP); Makoto Suzuki, Sodegaura (JP); Kazumi Mizutani, Sodegaura (JP); Hiromi Jouyama, Sodegaura (JP); Isao Hara, Sodegaura (JP); Takaomi Hayashi, Sodegaura (JP); Shinji Kiyono, Sodegaura (JP); Setsuko Fujiyoshi, Sodegaura (JP); Hiroyuki Sakayama, Sodegaura (JP); Mitsuyuki Mizoguchi, Sodegaura (JP); Tsuyoshi Matsumoto, Sodegaura (JP); Yoshiharu Hirose, Sodegaura (JP)

(73) Assignee: Mitsui Chemicals, Inc., Tokyo (JP)

(*) Notice: Subject to any disclaimer, the term of this patent is extended or adjusted under 35 U.S.C. 154(b) by 16 days.

(21) Appl. No.: 10/149,381

(22) PCT Filed: Oct. 12, 2001

(86) PCT No.: PCT/JP01/09011

§ 371 (c)(1), (2), (4) Date: Jun. 12, 2002

(87) PCT Pub. No.: WO02/30995

PCT Pub. Date: Apr. 18, 2002

(65) Prior Publication Data

US 2003/0023003 A1 Jan. 30, 2003

(30) Foreign Application Priority Data

Oct. 12, 2000 (JP) ......................................... 2000-312248

(51) Int. Cl.$^7$ ............................ C08F 4/46; C08F 118/04
(52) U.S. Cl. ........................ 526/173; 526/179; 526/180; 526/181; 526/210; 526/319
(58) Field of Search ................................. 526/179, 180, 526/181, 210, 319, 173

(56) References Cited

U.S. PATENT DOCUMENTS

| 4,588,795 A | * | 5/1986 | Dicker et al. ................ 526/192 |
| 4,847,328 A | * | 7/1989 | Hutchins et al. ............. 525/107 |
| 5,668,231 A | | 9/1997 | Varshney et al. |
| 5,945,487 A | | 8/1999 | Ohkoshi et al. |

FOREIGN PATENT DOCUMENTS

| EP | 0 164 124 A2 | | 12/1985 |
| EP | 0 194 110 A1 | * | 10/1986 |
| EP | 0 244 953 A1 | * | 11/1987 |
| EP | 0 773 267 A1 | | 5/1997 |
| JP | 61-133212 A | | 6/1961 |
| JP | 48-38617 | | 11/1973 |
| JP | 11-21306 A | | 1/1999 |
| WO | WO 96/03464 A1 | | 2/1996 |

* cited by examiner

Primary Examiner—Robert D. Harlan
(74) Attorney, Agent, or Firm—Burns, Doane, Swecker & Mathis, L.L.P.

(57) ABSTRACT

The purpose of the present invention is to provide polymerization catalyst which can produce quite efficiently (co)polymer having number average molecular weight and number of molecules which are accurately controlled in producing method of (co)polymer by the polymerization of polar unsaturated compound, and provide living polymerized (co)polymer obtained according to the producing method. For the purpose, polymerization catalyst composition which comprises the composition comprising organic oxysalt compound and hydroxycarbonyl compound having at least both an alcoholic hydroxyl group and a carbonyl group in the same molecule is provided and the polar unsaturated compound is polymerized by using the polymerization catalyst composition. The composition containing the obtained (co)polymer were able to provide thermosetting powder coating composition having particularly excellent characteristics.

17 Claims, No Drawings

PROCESS FOR THE PRODUCTION OF LIVING (CO)POLYMERS AND USE OF THE (CO)POLYMERS

TECHNICAL FIELD

The invention described herein relates to a method of producing a living polymerized (co)polymer by polymerizing a polar unsaturated compound using an organic oxysalt compound as catalyst. These polymer and copolymer are very important ones as raw materials of polymer materials and functional polymers.

The invention relates particularly to compositions of thermosetting powder coatings, more particularly, to the compositions of thermosetting powder coatings having excellent storage stability (blocking resistance), external appearance (surface flatness, brightness, and transparency), physical property (hardness, scratch resistance, and recoating property), and chemical property (weather resistance, acid resistance, and solvent resistance) and to the compositions of thermosetting powder coatings which can provide baked coating films particularly suitable for use of coating vehicles.

BACKGROUND ART

Enormous number of researches have been made with regard to the polymerization of polar unsaturated compounds for many years. Among them, recently a number of researches on living polymerization catalysts have been conducted aiming at producing polymers having less narrow molecular weight distribution by controlling optionally and rigorously the molecular weight of polymers to be obtained and various polymerization catalyst systems have been developed which have the property of living radical polymerization, living anion or living coordination anion polymerization (for example, living radical polymerization catalysts: Koubunshi, vol.48, (7) pp 498–501 (1999); living anion and living coordination anion polymerization catalysts: Shin koubunshi Jikkengaku vol.2"Shin Koubunshi no Gousei•Hannou(1)—Fukakei koubunshi no Gousei—" pp 165–196, Kyouritu Shuppan Kabushikigaisha (1995)).

Many effective living polymerization catalysts have been developed and from the view point of "the number of produced polymer molecules corresponding to the number of molecules of polymerization catalyst used" in most cases only one polymer molecule is obtained from one molecule of polymerization catalyst, that is, stoichiometric polymerization is observed. This stoichiometric living polymerization requires one molecule of the polymerization catalyst to produce one polymer molecule which is not an efficient and effective method of production in the light of industrially practical use. On the other hand, in catalytic living polymerization wherein plural number of polymer molecules are produced by one molecule of polymerization catalyst it is possible to avoid or simplify the complicated processes of separating catalysts and control unfavorable effects on the polymer property to a minimum by reducing drastically the concentration of catalyst components remaining in the polymer produced. Furthermore, this method is a really practical one from the view point of reducing environmental load and catalyst cost. Actually, the polymerization catalyst systems of polar unsaturated compounds which have been practiced are composed of very small amount of radical generating agents (which mean the catalysts described herein) and a large amount of chain transfer agents. Although the polymerization does not proceed like living one, it produces very efficiently the number of polymer molecules comparable to the number of molecules of the chain transfer agents from one radical molecule.

The known examples of the catalytic living polymerization of polar unsaturated compounds are $\hat{1}$ polymerization of methacrylate using alkali metal alkoxide as catalyst and alcohol as chain transfer agent (S. N. Lewis et al., Progress in Organic Coating 12, 1–26 (1984)) and $\hat{2}$ polymerization of methacrylate and acrylate using quaternary ammonium salt or Lewis acid as catalyst and silyl ketene ketal as chain transfer agent (O. W. Webster et al., J.Am.Chem.Soc., 105, 5703 (1983) or Shin koubunshi Jikkengaku vol.2"Shin Koubunshi no Gousei•Hannou(1)—Fukakei koubunshi no Gousei—" pp 365–386, Kyouritu Shuppan Kabushikigaisha (1995)). However, the method $\hat{1}$ is a good polymerization method for producing oligomers having average molecular weight of 500–3000 but cannot produce oligomers having average molecular weight greater than or equal to 3000 or (co)polymers by controlling their molecular weight and molecular weight distribution precisely. Furthermore, since this method uses alcohol as both chain transfer agent and polymerization solvent, transesterification proceeds simultaneously with polymerization. Therefore, there is a drawback that this method cannot apply to the monomers when the transesterification causes some problems. The method $\hat{2}$ has not been practiced yet, because silyl ketene ketal is expensive and unstable and there are some problems in the production method.

As an important use utilizing the property of the (co) polymer which is obtained by the method of the present invention there are powder coatings and prior arts relating to them which will be explained in the following:

Solvent type coating materials have usually been used for painting bodies and those which satisfy various requirements have been developed and used in order to be utilized in the field of automobiles where rigorous quality specification is required.

Recently in the technical field of coating materials, shift to using powder coatings have been expected in place of solvent type coating materials in the light of local or global environment conservation, environment improvement of health and safety at work, prevention of fire and explosion, and resource conservation. And from the historical and social requests, as expectation for high function performance and diversification of powder coatings have been increased, high paint film performance (for example, weather resistance, acid rain resistance, and scratch resistance) of powder coatings comparable to solvent type coating materials have been requested. However, in spite of severe requests for paint film performance, powder coatings which satisfy these requests have not necessarily been placed on the market.

As specific examples of the conventional types of powder coatings there are those of epoxy resin and polyester resin. However, these coatings have not only problems in weather resistance but also in resistance against the acid rain which has recently become a particular problem and, therefore, these problems were regarded as critical in the field of painting automobile bodies.

For the purpose of eliminating the drawback, acrylic powder coatings was proposed in JP-B-48-38617 and remarkable improvement in weather resistance has been realized. Since then many researches have been made on the acrylic powder coatings, however, these acrylic powder coatings have not satisfied sufficiently external appearance property, physical property, chemical property, storage property, and particularly surface flatness and blocking resistance simultaneously. Reduction in melt viscosity is the most effective to improve the surface flatness, however, in order to reduce the melt viscosity it was necessary to lower a glass transition temperature by which method it was impossible to satisfy both the surface flatness and the blocking resistance.

For the purpose of providing the surface flatness and the blocking resistance simultaneously, thermosetting powder coatings composition (WO96/03464) is proposed which uses acrylic (co)polymer having narrow molecular weight distribution. It is surely possible to have the surface flatness and the blocking resistance simultaneously by narrowing the molecular weight distribution. However, according to the method of living polymerization which is described as an example of producing method of the acrylic (co)polymer used therein, due to the insufficient recoating property (adhesion property with top coatings at repainting and maintenance) the powder coatings, particularly as top coatings, did not show the effectiveness sufficiently. As another example of the production, an acrylic (co)polymer having the prescribed molecular weight distribution is shown by fractionating the acrylic (co)polymer obtained by radical polymerization method. However, in this method the proportion of the (co)polymer to be obtained as a target is low and a process of the fractionation is required, therefore, the method is costly and not practical. Researches on various living polymerization methods have been conducted for the purpose of narrowing the molecular weight distribution of acrylic (co)polymer, however, because of coloring, stench, and high cost of the acrylic (co)polymers produced there have not been the method of producing acrylic (co)polymers and thermosetting powder coatings which can favorably be applied to painting automobile bodies and parts for vehicles such as automobiles, particularly, painting of top coatings.

The purpose of the present invention is to provide a method of producing living (co)polymers effectively and efficiently by catalytic living polymerization of polar unsaturated compounds when (co)polymers are produced by the polymerization of polar unsaturated compounds.

Another purpose of the present invention is to provide thermosetting powder coating compositions (for example acrylic thermosetting powder coating compositions) having storage stability, external appearance property, physical property, and chemical property in the light of the problems described above; particularly to provide thermosetting powder coating compositions (for example acrylic thermosetting powder coating compositions) which are applied favorably to the painting automobile bodies and parts for vehicles such as automobiles (aluminum wheels, windshield wipers, pillars, door handles, fenders, bonnets, air spoilers, stabilizers, and front grilles), particularly, to the painting of top coatings.

DISCLOSURE OF THE INVENTION

As a result of the extensive and through researches to achieve the purposes described above, the inventors of the present invention have completed the present invention by finding out that by a method of polymerization of polar unsaturated compounds using an organic oxysalt compound as catalyst in the presence of a hydroxycarbonyl compound having at least both an alcoholic hydroxyl group and a carbonyl group in the same molecule the polymerization has the property of stoichiometric or catalytic living polymerization and it is possible to control precisely not only the average molecular weight of the (co)polymer produced but also the number of the molecules of the (co)polymer.

That is, the present invention is a method of producing a living polymerized (co)polymer comprising polymerization of polar unsaturated compound using organic oxysalt compound as catalyst in the presence of a hydroxycarbonyl compound having at least both an alcoholic hydroxyl group and a carbonyl group in the same molecule when producing the (co)polymer by (co)polymerization of polar unsaturated compounds using oxysalt compound as catalyst.

Furthermore, as a result of more extensive and through researches to resolve the problems of the prior arts as described above, the inventors found out the knowledge that by using the (co)polymer(A) as described above it is possible to provide a thermosetting powder coating composition having excellent storage stability, external appearance, physical property, and chemical property (for example, an acrylic thermosetting powder coating composition) and completed the present invention.

The present invention is specified by items as described in the following [1]–[17]:

[1] A method of producing a living polymerized (co)polymer which method comprises polymerization of polar unsaturated compound in the presence of a hydroxycarbonyl compound having at least both an alcoholic hydroxyl group and a carbonyl group in the same molecule using an organic oxysalt compound as catalyst.

[2] The method as described in [1], wherein a cation forming the organic oxysalt compound is an alkali metal cation, a tetraalkylammonium cation, a trialkylsulfonium cation, a tetraarylphosphonium cation, a hexaarylphosphoranilidene ammonium cation, or a tetrakis{tris(dialkylamino)phosphoranilideneamino}phosphonium cation.

[3] The method as described in [1], wherein the cation forming the organic oxysalt compound is a tetraalkylammonium cation, a tetraarylphosphonium cation, or a hexaarylphosphoranilidene ammonium cation.

[4] The method as described in any one of [1] to [3], wherein an anion forming the organic oxysalt compound is an organic oxyanion derived from a monohydric alcohol, an organic oxyanion derived from a monocarboxylate, or an organic oxyanion derived from a polycarboxylate.

[5] The method as described in any one of [1] to [3], wherein an anion forming the organic oxysalt compound is an organic oxyanion derived from a monohydric alcohol.

[6] The method as described in any one of [1] to [5], wherein the hydroxycarbonyl compound is an α-hydroxyketone or an α-hydroxycarboxylate.

[7] The method as described in any one of [1] to [6], wherein the polar unsaturated compound is a chemical compound having both a polar functional group selected from carbonyl, cyano, or pyridyl groups, and an unsaturated group in the same molecule and, in addition, the functional group and the unsaturated group form a direct or indirect conjugated system.

[8]
The method as described in any one of [1] to [6], wherein the polar unsaturated compound is a (meth)acrylate, a (meth)acrylonitrile, a (meth)acrylamide, a vinylpyridine, a N-substituted maleimide, a vinylketone, or a styrene derivative.

[9] The method as described in any one of [1] to [6], wherein the polar unsaturated compound is a monoester between a monohydric alcohol and acrylic acid or methacrylic acid, a monoester between acrylic acid or methacrylic acid and a dihydric alcohol one end of which is protected by ether linkage, a polyester formed by esterification between acrylic acid or methacrylic acid and all of the hydroxyl groups of the polyhydric alcohol, having two or more hydroxyl groups, an acrylonitrile, a methacrylonitrile, a N,N-disubstituted mono(meth)acrylamide, a pyridine substituted by vinyl or isopropenyl group, a N-aromatic substituted maleimide or a vinylketone.

[10] The method as described in any one of [1] to [9], wherein an active hydrogen compound is used as chain transfer agent.

[11] The method as described in any one of [1] to [9], wherein the chain transfer agent is a , monocarboxylate, a polycarboxylate, a monohydric alcohol, a polyhydric alcohol, a monothiol, a (co)poly(alkyleneoxide) having an active hydrogen at its end and/or in its backbone chain, a (co)poly{(meth)acrylate)}, a (co)poly{(meth)acrylonitrile)}, a (co)poly{(meth)acrylamide}, a (co)poly(vinylpyridine), a (co)poly(N-substituted maleimide), a (co)poly(vinylketone), or a (co)poly(styrene derivative).

[12] The method as described in any one of [1] to [11], wherein the copolymer is produced by using at least two or more of the polar unsaturated compounds together.

[13] A thermosetting powder coating composition comprising;
   a living polymerized (co)polymer (A) obtained by the method as described in any one of [1] to [12] and
   a curing agent composition component(B) which can cure said (co)polymer.

[14] The thermosetting powder coating composition as described in [13], wherein the (co)polymer(A) comprises an epoxy group.

[15] The thermosetting powder coating composition as described in [13] or [14], wherein the (co)polymer(A) has a glass transition temperature of 10° C.–100° C.

[16] The thermosetting powder coating composition as described in any one of [13] or [15], wherein the curing agent composition component(B) which can cure the (co)polymer comprising;
(b-1) a polycarboxylic acid and/or
(b-2) a polycarboxylic acid anhydride.

[17] The thermosetting powder coating composition as described in any one of [13] to [16] wherein the thermosetting powder coating composition is for use as top coating of automobiles.

BEST MODES FOR CARRYING OUT THE INVENTION

The present invention relates to a method of producing a living polymerized (co)polymer by the (co)polymerization of a polar unsaturated compound using organic oxysalt compound as catalyst in the presence of hydroxycarbonyl compound having at least both an alcoholic hydroxyl group and a carbonyl group in the same molecule.

The organic oxysalt compound used in the present invention is a salt compound composed of an anion part having univalent organic oxyanion structure expressed by the formation of bonding an organic group to an oxygen atom as total structure or partial one and a cation part which is formed by a metal cation or an organic cation which can neutralize the anion in terms of electric charge.

As metal cations among the ones forming these organic oxysalt compounds any metal cations may be used as far as they do not hinder the purposes of the present invention, and as specific examples of such cations, there are cations of alkali metals or those of alkaline earth metals. As organic cations any cations may be used as far as they do not hinder the purposes of the present invention and as specific examples of such cations, there are quaternary ammonium cations, tertiary sulfonium cations, quaternary phosphonium cations, phosphoranilidene ammonium cations, or phosphoranilideneaminophosphonium cations.

As quaternary ammonium cations among these organic cations, there are, for example, ammonium ions which have nitrogen atom bonding to four hydrocarbon groups such as tetramethylammonium ion, tetraethylammonium ion, tetrabutylammonium ion, tetrahexylammonium ion, tricyclohexylmethylammonium ion, N,N-dimethylpiperidinium ion, or trimethylphenylammonium ion, or nitrogenous heterocyclic ammonium ions such as N-methylpyridinium ion, N-tert-butylpyridinium ion, N-methylpyrrolidinium ion, N,N'-dimethylimidazolinium ion, or N,N'-diisopropylimidazolinium ion.

As tertiary sulfonium cations there are, for example, trimethylsulfonium cation, triethylsulfonium cation, triisopropylsulfonium cation, tributylsulfonium cation, or phenyldimethylsulfonium cation.

As quaternary phosphonium cations, there are, for example, tetramethylphosphonium cation, tetraethylphosphonium cation, tetrabutylphosphonium cation, tetrahexylphosphonium cation, tetracyclohexylphosphonium cation, tetraphenylphosphonium cation, tetramethoxyphenylphosphonium cation, tetranaphthylphosphonium cation.

As phosphoranilidene ammonium cations, there are, for example, hexamethylphosphoranilidene ammonium cation, hexaethylphosphoranilidene ammonium cation, hexapropylphosphoranilidene ammonium cation, hexabutylphosphoranilidene ammonium cation, hexaphenylphosphoranilidene ammonium cation, or hexanaphthylphosphoranilidene ammonium cation.

As phosphoranilideneaminophosphonium cations, there are, for example,
tris(dimethylamino){tris(dimethylamino)phosphoraniliden eamino}phosphonium cation,
tris(diethylamino){tris(diethylamino)phosphoranilidenea mino}phosphonium cation,
bis(dimethylamino)bis{tris(dimethylamino)phosphoranilid eneamino}phosphonium cation,
dimethylaminotris{tris(dimethylamino)phosphoranilidenea mino}phosphonium cation,
tetrakis{tris(dimethylamino)phosphoranilideneamino}phos phonium cation,
tetrakis{tris(morpholino)phosphoranilideneamino}phospho nium cation, or
tetrakis{tris(piperazino)phosphoranilideneamino}phospho nium cation.

Among cations which form the organic oxysalt compounds, preferable ones are, for example, alkali metal cations such as lithium cation, sodium cation, potassium cation, cesium cation, or rubidium cation, and tetraalkylanunonium ions such as tetramethylammonium ion, tetraethylaxmnonium ion, tetrabutylammonium ion, or tetrahexylammonium ion, and trialkylsuiphonium cations such as trimethylsuiphonium cation, triethylsuiphoniurn cation, triisopropylsulphonium cation, or tributylsuiphonium cation, and tetraarylphosphonium cations such as tetraphenyiphosphonium cation, tetramethoxyphenyiphosphonium cation, or tetranaphthylphosphonium cation, and hexaarylphosphoranilidene ainmonium cations such as hexaphenyiphosphoranilidene ammonium cation or hexanaphthylphosphoranilidene ammonium cation, or tetrakis{tris(dialkylamino)phosphoranhideneamino)}phosphonium cations such as tetrakis{tris(dimethylamino) phosphoranhideneamino}phosphonium cation, tetrakis{tris(morpholino)phosphoranilideneamino}phosphonium cation, or tetrakis{tris(piperazino)

phosphoranilideneamino}phosphonium cation; and more preferable cations are tetraslkylammonium cations, tetrasryiphosphonium cations, or hexasryiphosphoranilidene ammonium cations.

On the other hand, as anions which form the organic oxysalt compounds in the present invention, any organic anions may be used as far as they do not hinder the purpose of the invention. As specific examples, there are organic oxyanions of monohydric alcohols which are derived by leaving active hydrogen atoms as protons on the alcoholic hydroxyl groups, for example, methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol, cinnamyl alcohol, or perfluoro-tert-butyl alcohol, and organic oxyanions of polyhydric alcohols which are derived by leaving active hydrogen atoms as protons on the alcoholic hydroxyl groups, for example, ethylene glycol, propylene glycol, diethylene glycol, dipropylene glycol, 1,3-propandiol, 1,3-butanediol, 1,4-butanediol, 1,6-hexanediol, 1,4-cyclohexanediol, trimethylolpropane, glycerin, diglycerin, pentaerythritol, or dipentaerythritol, and organic oxyanions of monocarboxylates which are derived by leaving active hydrogen atoms as protons existing on α-carbons, for example, methyl acetate, ethyl acetate, cyclohexyl propionate, isopropyl butyrate, methyl isobutyrate, t-butyl isobutyrate, hexyl caproate, butyl laurate, methyl stearate, ethyl oleate, methyl phenyl acetate, methyl cyclohexanecarboxylate, 1,2-bis(2-propylcarbonyloxy)ethane, or 1,2,3-tris(2-propylcarbonyloxy)propane, and organic oxyanions of carboxylates which are derived by leaving active hydrogen atoms as protons existing on α-carbons in carbonyl group, for example, dimethyl malonate, dimethyl methylmalonate, diethyl succinate, butyl 2,3-dimethylsuccinate, methyl adipate, ethyl suberate, methyl butanetetracarboxylate, 1,2-bis(2-methoxycabonylethoxy)ethane, 1,2-bis(2-ethoxycarbonylpropoxy)ethane, 1,2-bis(2-ethoxycarbonylpropylmercapto)ethane, N,N,N',N'-tetrakis (2-butoxycarbonylpropyl)ethylenediamine or oligo or poly (methyl methacrylate) having average molecular weight of 200 to 1,000,000, and organic oxyanions of ketocarboxylates which are derived by leaving active hydrogen atoms as protons existing on α-carbons in carbonyl groups, for example, ethyl acetoacetate, cyclopentyl acetoacetate, methyl carbamoylacetate, ethyl 2-cyclohexylcarbonylacetate, or butyl benzoylacetate.

Among these anions, preferable anions are organic oxyanions derived from monohydryic alcohols, those derived from monocarboxylates, or those derived from polycarboxylates and more preferable ones are organic oxyanions derived from monohydric alcohols.

The organic oxysalt compounds used in the present invention are formed by the combination of these organic oxyanions and metal cations or organic cations described above, and the combination of two or more than two kinds of the organic oxysalt compounds may be used.

Quantity of the organic oxysalt can be determined optionally depending on aimed molecular weight of (co)polymer to be produced and can be determined by calculating formulas (1) or (2) described later.

The hydroxycarbonyl compounds used in the present invention have at least both an alcoholic hydroxyl group and a carbonyl group in the same molecule, and specific examples of these compounds are α-hydroxyketones, for example, 1-hydroxy-1,1-dimethyl-2-propanone, 1-hydroxy-1,1-dimethyl-3,3,3-trimethyl-2-propanone, α-hydroxy-α-methylethylcyclohexylketone, α-hydroxy-α-methyl-α'-methylcyclohexylketone, α-hydroxydicyclohexylketone, α-hydroxy-α'-methyldicyclohexylketone, α-hydroxy-α-methylphenylketone, α-hydroxycyclohexylphenylketone, benzoin, α-hydroxy-α, α-diphenylacetophenone, and α-hydroxycarboxylates, for example, ethyl α-hydroxyacetate, methyl lactate, cyclohexyl lactate, ethyl α-hydroxyacetate, butyl α-hydroxy-iso-butyrate, methyl α-hydroxy-α-phenylacetate, ethyl α-hydroxy-α, α-diphenylacetate, and α-hydroxy-N,N-disubstituted amides, for example, α-hydroxy-N,N-dimethylacetamide, α-hydroxy-α, α-dimethyl-N,N-dimethylacetamide, α-hydroxy-α, α-diphenyl-N,N-dimethylacetamide, α-hydroxy-N,N-diethylpropionamide or α-hydroxy-α-methyl-N,N-diethylpropionamide. As other examples, any hydroxyketone compounds may be used as far as they do not hinder the purposes of the present invention and two or more than two kinds of hydroxyketone compounds described above may be used together.

Among these compounds, preferable α-hydroxyketones are, for example, 1-hydroxy-1,1-dimethyl-2-propanone, 1-hydroxy-1,1-dimethyl-3,3,3-trimethyl-2-propanone, α-hydroxy-α-methylethylecyclohexylketone, α-hydroxy-α-methylethyl-α'-methycyclohexylketone, α-hydroxydicyclohexylketone, α-hydroxydicyclohexylketone, α-hydroxy-α-methylphenylketone, α-hydroxycyclohexylphenylketone, benzoin, α-hydroxy-α, α-diphenylacetophenone, and α-hydroxycarboxylates, for example, ethyl α-hydroxyacetate, methyl lactate, cyclohexyl lactate, ethyl α-hydroxybutyrate, butyl α-hydroxyisobutyrate, methyl α-hydroxy-α-phenylacetate, ethyl α-hydroxy-α, α-diphenylacetate, and more preferable α-hydroxyketones are, for example, α-hydroxyacetone, 1-hydroxy-1,1-dimethyl-2-propanone, 1-hydroxy-1,1-dimethyl-3,3,3-trimethyl-2-propanone α-hydroxy-α-methylethylcyclohexylketone, α-hydroxy-α-methylethyl-α'-methylcyclohexylketone, α-hydroxydicyclohexylketone, α-hydroxy-α'-methyldicyclohexylketone, α-hydroxy-α-methylethylphenylketone, α-hydroxycyclohexylphenylketone, benzoin, α-hydroxy-α, α-diphenylacetophenone.

Quantity of the hydroxyketone to be used is usually more than 0.05 moles, preferably 0.80 to 1.20 moles, more preferably 0.95 to 1.05 mole to one mole of the organic oxysalt compound. Excess quantity of the hydroxyketone acts as a chain transfer agent.

In the present invention it is possible to achieve stoichiometric and catalytic living polymerization of polar unsaturated compound using organic oxysalt compound as catalyst in the presence of hydroxycarbonyl compounds having at least both an alcoholic hydroxyl group and a carbonyl group in the same molecule. More specifically, 1̂ the stoichiometric living polymerization can be performed by contacting organic oxysalt compounds with polar unsaturated compounds for polymerization in the presence of hydroxycarbonyl compounds having at least both an alcoholic hydroxyl group and a carbonyl group in the same molecule, and 2̂the catalytic living polymerization can further be carried out using active hydrogen compound as chain transfer agent. Since in both cases the polymerization proceeds livingly, the average molecular weight and the number of the molecules of the (co)polymer to be produced may be calculated and predicted approximately by the following calculation formulas (1) or (2) wherein Mwa indicates the molecular weight of the oxyanion in the organic oxysalt compound; Mb indicates the number of moles of polar unsaturated compound; Ma indicates the number of moles of the said oxyanion; MWb indicates the molecular weight of the polar unsaturated compound; MWc indicates the molecular weight of the chain transfer agent; Mc indicates the number of moles of the chain transfer agent.

$\hat{1}$ (co)polymer obtained by stoichiometric living polymerization:

<number average molecular weight>≈Mwa+(Mb/Ma)×MWb

<number of molecules of the produced (co)polymer>≈(number of the said organic oxysalt compound) (1)

$\hat{2}$ (co)polymer obtained by catalytic living polymerization:

<number average molecular weight>≈(MWa×Ma+MWc×Mc+Mb× MWb)/(Ma+Mc)

<number of molecules of the produced (co)polymer>≈(number of molecules of the said organic oxysalt compound+number of the molecule of the chain transfer agent). (2)

As can be seen from the calculation formulas described above, according to the methods of the present invention it is possible to produce a (co)polymer having optionally controlled number average molecular weight and number of the produced (co)polymer by adjusting molecular weight and number of moles of the organic oxysalt compound, polar unsaturated compound or chain transfer agent, i.e., active hydrogen compound to be used.

In the method of the present invention, the unsaturated group is unsaturated group having one to four valences derived from alkene and the polar unsaturated compound is the chemical compound having polar functional group and unsaturated group in the same molecule selected from the group consisting of carbonyl, cyano, and pyridyl, and, in addition, the functional group and the unsaturated group form a direct or indirect conjugated systems.

These chemical compounds are, for example, (1) (meth) acrylates, (2) (meth)acrylonitriles, (3) (meth)acrylamides, (4) vinylpyridines, (5) N-substituted maleimides, (6) vinylketones, or styrene derivatives. Any polar unsaturated compounds may be used as far as they can achieve anionic polymerization by the method of the present invention.

As specific examples, (1) (meth)acrylates are esters of acrylic acid or methacrylic acid. These esters are, for example:

(1)$\hat{1}$ monoesters formed by esterification between monohydric alcohols and acrylic acid or methacrylic acid: these esters are, for example, methyl acrylate, methyl methacrylate, ethyl acrylate, propyl methacrylate, butyl acrylate, 2-ethylhexyl methacrylate, lauryl acrylate, stearyl methacrylate, 1,1,1,3,3,3-hexafluoroisopropyl acrylate, 1,1, 1,3,3,3-hexafluoroisopropyl methacrylate, 2,2,2-trifluoroethyl acrylate, 2,2,2-trifluoroethyl methacrylate, 1H,1H,2H,2H-heptadecafluorodecyl acrylate, allyl acrylate, allyl methacrylate, cyclohexyl methacrylate, isophenyl acrylate, glycidyl acrylate, glycidyl methacrylate, tetrahydrofurfuryl acrylate, benzyl acrylate or β-phenylethyl methacrylate.

(1)-$\hat{2}$ Monoesters formed by esterification between dihydric alcohols whose one end is protected by an ether bond and acrylic acid or methacrylic acid: these esters are, for example, 2-methoxyethyl acrylate, 2-ethoxyethyl methacrylate, 2-phenoxyethyl acrylate, 2-dicyclopentenyloxyethyl acrylate, 1-methoxy-2-propyl methacrylate, 3-methoxypropyl acrylate, 4-ethoxybutyl methacrylate, 6-methoxyhexamethyl acrylate, methoxydiethylene glycol acrylate, phenoxydipropylene glycol methacrylate, ethoxytripropylene glycol methacrylate, ethoxypolyethylene glycol acrylate, or methoxypolypropylene glycol methacrylate.

(1)-$\hat{3}$ Polyesters formed by esterification between acrylic acid or methacrylic acid and all of the hydroxyl groups of dihydric alcohols and polyhydric alcohols having more than two hydroxyl groups: these esters are, for example, ethylene glycol diacrylate, ethylene glycol dimethacrylate, propylene glycol diacrylate, propylene glycol dimethacrylate, 1,3-propanediol dimethacrylate, 1,4-butanediol diacrylate, 1,6-hexanediol dimethacrylate, neopentyl glycol diacrylate, neopentyl glycol dixnethacrylate, diethylene glycol diacrylate, dipropylene glycol dimethacrylate, triethylene glycol dimethacrylate, tripropylene glycol diacrylate, polyethylene glycol diacrylate, polypropylene glycol diacrylate, or polypropylene glycol dimethacrylate, and, in addition, glycerin triacrylate, glycerin trimethacrylate, pentaerthritol tetramethacrylate, dipentaerythritol hexaacrylate, trimethylolpropane triacrylate, poly(ethylene oxide)triol triacrylate, poly(propylene oxide)triol triacrylate, or poly(propylene oxide)triol trimethacrylate.

(1)-$\hat{4}$ Esters formed by esterification between alcohols containing ester bonds and acrylic acid or methacrylic acid: these esters are, for example, 2-benzoyloxyethyl acrylate, 2-benzoyloxyethyl methacrylate, 2-acetyloxy acrylate, 5-tetrahydrofurfuryloxycarbonylpentyl acrylate, 5-tetrahydrofurfuryloxycarbonylpentyl methacrylate, 2,2,6, 6-tetramethyl-4-oxy-5-oxa-heptane-1,7-diyl-diacrylate.

(1)-$\hat{5}$ Esters formed by esterification between alcohols having cycloacetal bond and acrylic acid or methacrylic acid: these esters are, for example, 2-t-butyl-1,3-dioxycyclopentane-2'-il methacrylate, or 2-t-butyl-5-ethyl-5-vinylcarbonyloxymethyl-1,3-dioxycyclohexane-2'(2)-il acrylate.

(1)-$\hat{6}$ Esters formed by esterification between oxysuccinimide and acrylic acid or methacrylic acid: these esters are, for example, N-oxysuccinimide acrylate or N-oxysuccinimide methacrylate.

(1)-$\hat{7}$ Esters formed by esterification between alcohols having secondary amino group and acrylic acid or methacrylic acid: these esters are, for example, 2-dimethylaminoethyl acrylate or 2-ethylpropylaminoethyl methacrylate.

(1)-$\hat{8}$ Esters formed by esterification between alcohols having cyano group and acrylic acid or methacrylic acid: these esters are, for example, 2-cyanoethyl acrylate or 2-cyanopropyl methacrylate.

(2) (Meth)acrylonitriles are, for example, acrylonitrile or methacrylonitrile.

(3) (Meth)acrylamides are, for example, acrylaniide, N-monosubstituted or N,N-disubstituted(meth)acrylamides. One of these compounds is, for example, acrylamide.

(3)-$\hat{1}$ N-monosubstituted (meth)acrylamides: these compounds are, for example, N-methylacrylamide, N-ethylacrylamide, N-propylacrylamide, N-butylacrylamide, N-octylacrylamide, N-phenylacrylamide, N-glycidylacrylamide, or N,N'-ethylenebisacrylamide.

(3)-$\hat{2}$ N,N-disubstituted mono(meth)acrylamides: these compounds are, for example, N,N-dimethylacrylamide, N-ethyl-N-methylacrylamide, N,N-diethylacrylamide, N,N-di-n-propylacrylamide, N,N-dioctylacrylamide, N,N-diphenylacrylamide, N-ethyl-N-glycidylacrylamide, N,N-diglycidylacrylamide, N-methyl-N-(4-glycidyloxybutyl) acrylamide, N-methyl-N-(5-glycidyloxypentyl)acrylamide, N-methyl-N-(6-glycidyloxyhexyl)acrylamide, N-acryloylpyrrolidine, N-acryloyl-L-proline methyl ester, N-acryloylpiperidine, N-acryloylmorpholine or 1-acryloylimidazole.

(3)-3̂ N,N'-disubstituted bis(meth)acrylamides: these compounds are, for example, N,N'-diethyl-N,N'-ethylenebisacrylamide, N,N'-dimethyl-N,N'-hexamethylenebisacrylamide or (N,N'-ethylene)bisacrylamide.

(4) Vinylpyridines are, for example, vinyl or isopropenyl substituted
pyridines such as 2-vinylpyridine, 2-isopropenylpyridine, or 4-vinylpyrideine.

(5) N-substituted maleimides: these compounds are, for example,
- (5)-1̂ N-aliphatic substituted maleimides: these compounds are, for example, N-methylmaleimide or N-ethylmaleimide.
- (5)-2̂ N-aromatic substituted maleimides: these compounds are, for example, N-phenylmaleimide or N-(4-methylphenyl)maleimide.

(6) Vinylketones: These compounds are, for example, methylvinylketone, isopropenylmethylketone, ethylvinylketone, ethylisopropenylketone, butylvinylketone, or phenylvinylketone.

(7) Styrene derivatives: These compounds are, for example, p-methoxycarbonyl styrene, p-t-butoxycarbonylstyrene, or p-cyanostyrene. These polar unsaturated compounds may have any substituents other than those described above as far as they do not hinder the methods of the present invention.

Among these unsaturated compounds, preferable ones are, for example, as follows:
- (1)-1̂ Monoesters formed by esterification between monohydric alcohols and acrylic acid or methacrylic acid: these esters are, for example, methyl acrylate, methyl methacrylate, ethyl acrylate, propyl methacrylate, butyl acrylate, 2-ethylhexyl methacrylate, lauryl acrylate, stearyl methacrylate, 1,1,1,3,3,3-hexafluoroisopropyl acrylate, 1,1,1,3,3,3-hexafluoroisopropyl methacrylate, 2,2,2-trifluoroethyl acrylate, 2,2,2-trifluoroethyl methacrylate, 1H,1H,2H,2H-heptadecafluorodecyl acrylate, allyl acrylate, allyl methacrylate, cyclohexyl methacrylate, isophenyl acrylate, glycidyl acrylate, glycidyl methacrylate, tetrahydrofurfuryl acrylate, benzyl acrylate or β-phenylethyl methacrylate.
- (1)-2̂ Monoesters formed by esterification between dihydric alcohols whose one end is protected by an ether bond and acrylic acid or methacrylic acid: these esters are, for example, 2-methoxyethyl acrylate, 2-ethoxyethyl methacrylate, 2-phenoxyethyl acrylate, 2-dicyclopentenyloxyethyl acrylate, 1-methoxy-2-propyl methacrylate, 3-methoxypropyl acrylate, 4-ethoxybutyl methacrylate, 6-methoxyhexyl acrylate, methoxydiethylene glycol acrylate, phenoxydipropylene glycol methacrylate, ethoxytripropylene glycol methacrylate, ethoxypolyethylene glycol acrylate, or methoxypolypropylene glycol methacrylate.
- (1)3̂ Polyesters formed by esterification between acrylic acid or methacrylic acid and all of the hydroxyl groups of a polyhydric alcohol having two or more than two hydroxyl groups: these esters are, for example, ethylene glycol diacrylate, ethylene glycol dimethacrylate, propylene glycol diacrylate, propylene glycol dimethacrylate, 1,3-propanediol dimethacrylate, 1,4-butanediol diacrylate, 1,6-hexanediol dimethacrylate, neopentyl glycol diacrylate, neopentyl glycol dimethacrylate, diethylene glycol diacrylate, dipropylene glycol dimethacrylate, triethylene glycol dimethacrylate, tripropylene glycol diacrylate, polyethylene glycol diacrylate, polypropylene glycol diacrylate, polypropylene glycol dimethacrylate, and, in addition, glycerin triacrylate, glycerin trimethacrylate, pentaerythritol tetramethacrylate, dipentaerythritol hexaacrylate, trimethylolpropane triacrylate, poly(ethylene oxide)triol triacrylate, poly(propylene oxide)triol triacrylate, or poly(propylene oxide)triol trimethacrylate.

(2) Acrylonitrile or methacrylonitrile (3)-2̂ N,N-disubstituted mono(meth)acrylamides: these compounds are, for example, N,N-dimethylacrylamide, N-ethyl-N-methylacrylamide, N,N-diethylacrylamide, N,N-di-n-propylacrylamide, N,N-dioctylacrylamide, N,N-diphenylacrylamide, N-ethyl-N-glycidylacrylamide, N,N-diglycidylacrylamide, N-methyl-N-(4-glycidyloxybutyl)acrylamide, N-methyl-N-(5-glycidyloxypentyl)acrylamide, N-methyl-N-(6-glycidyloxyhexyl)acrylamide, N-acryloylpyrrolidine, N-acryloyl-L-proline methyl ester, N-acryloylpiperidine, N-acryloylmorpholine or N-acryloylimidazole.

(4) Vinyl or isopropenyl substituted pyridines: these compounds are, for example, 2-vinylpyridine, 2-isopropenylpyridine, or 4-vinylpyrideine.

(5)-2̂N-aromatic maleimides: these compounds are, for example, N-phenylmaleimide or N-(4-methylphenyl) maleimide; and (6) vinylketones: these compounds are, for example, methylvinylketone, isopropenylmethylketone, ethylvinylketone, ethylisopropenylketone, butylvinylketone, or phenylvinylketone.

More preferable polar unsaturated compounds as described above are as follows:
- (1)-1̂ Monoesters formed by esterification between monohydric alcohols and acrylic acid or methacrylic acid;
- (1)-2̂ monoesters formed by esterification between dihydric alcohols whose one end is protected by an ether bond and acrylic acid or methacrylic acid;
- (1)-3̂ polyesters formed by esterification between acrylic acid or methacrylic acid and all of the hydroxyl groups of polyhydric alcohols having two or more than two hydroxyl groups;
- (2) acrylonitrile or methacrylonitrile; and
- (3) N,N-disubstituted mono(meth)acrylamides.

In the present invention, the polar unsaturated compound can be used alone or in combination with two or more of them.

In case of applying plural compounds together, there may be a method of simultaneous application, that of sequential one or that of repeating sequential ones. When plural monomers are polymerized together simultaneously, higher random copolymers are obtained depending on the reactivity of the compounds and when two or more than two monomers are polymerized in sequential order, block polymers containing two or more than two blocks are obtained. When repeating the simultaneous and sequential polymerization, further complicated copolymers are obtained.

In the present invention an active hydrogen compound is used as chain transfer agent when catalytic living polymerization is carried out.

As the active hydrogen compounds there are, for example, active hydrogen compounds having active hydrogen on carbon atom, those having active hydrogen on oxygen atom, those having active hydrogen on nitrogen atom, or those having active hydrogen on sulfur atom. Any other active hydrogen compounds may be used as far as they do not hinder the methods of the present invention.

Specific examples of the active hydrogen compounds having active hydrogen on carbon atom are, for example, monocarboxylates such as ethyl acetate, cyclohexyl propionate, isopropyl butyrate, methyl isobutyrate, t-butyl isobutyrate, hexyl caproate, butyl laurate, methyl stearate, ethyl oleate, methyl phenylacetate, methyl cyclohexanecarboxylate, 1,2-bis(2-propylcarbonyloxy) ethane, or 1,2,3-tris(2-propylcarbonyloxy)propane; polycarboxylates such as dimethyl malonate, dimethyl methylmalonate, diethyl succinate, butyl 2,3-dimethylsuccinate, methyl adipate, ethyl suberate, methyl butanetetracarboxylate, 1,2-bis(2-methoxycarbonylethoxy) ethane, 1,2-bis(2-ethoxycarbonylpropoxy)ethane, 1,2-bis(2-ethoxycarbonylpropylmercapto)ethane, N,N,N',N'-tetrakis (2-butoxycarbonylpropyl)ethylenediamine; ketocarboxylates such as ethyl acetoacetate, cyclopentyl acetoacetate, methyl carbamoylacetate, ethyl 2-cyclohexylcarbonylacetate, or butyl benzoylacetate; nitriles such as acetonitrile, 2-cyanopropane, malononitrile, methylmalononitrile, 1,3-dicyanopropane, or adiponitrile; ketones such as acetone, methylethylketone, diisopropylketone, dicyclohexylketone, acetophenone, or isopropylphenylketone.

Specific examples of the active hydrogen compounds having active hydrogen on nitrogen atom are monohydric alcohols such as menthol, ethanol, n-propanol, isopropanol, n-butyl alcohol, sec-butyl, alcohol, tert-butyl alcohol, isopentyl alcohol, tert-pentyl alcohol, n-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol, cinnamyl alchohol, perfluoro-tert-butyl alcohol, α-hydroxyisopropylphenylketone, α-hydroxycyclohexylphenylketone, or methyl α-hydroxyisobutyrate; polyhydric alcohols such as ethylene glycol, propylene glycol, diethylene glycol, dipropylene glycol, 1,3-propandiol, 1,3-butanediol, 1,4-butaneidol, 1,6-hexanediol, 1,4-cyclohexanediol, trimethylolpropane, glycerin, diglycerin, pentaerythritol, or dipentaerythritol; aromatic hydroxy compounds such as phenol, cresol, xylenol, 2-naphthol, 2,6-dihydroxynaphthalene, or bisphenol A.

Specific examples of the active hydrogen compounds having active hydrogen on nitrogen atom are aliphatic or aromatic primary amines such as methylamine, ethylamine, n-propylamine, isopropylamine, n-butylamine, isobutylamine, sec-butylamine, tert-butylamine, cyclohexylamine, benzylamine, β-phenylethylamine, aniline, o-toluidine, m-toluidine, or p-toluidine; aliphatic or aromatic secondary amines such as dimethylamine, methylethylamine, diethylamine, di-n-propylamine, ethyl-n-butylamine, methyl-sec-butylamine, dipentylamine, dicyclohexylamine, N-methylaniline, or diphenylamine; polyamines having primary or secondary amino groups such as ethylenediamine, di(2-aminoethyl)amine, hexamethylenediamine, 4,4'-diaminodiphenylmethane, tri (2-aminoethyl)amine, N,N '-dimethylethylenediamine, N,N'-diethylethylenediamine, or (2-methylaminoethyl) amine; saturated cyclic secondary amines such as pyrrolidine, piperidine, morpholine, or 1,2,3,4-tetrahydroquinoline; unsaturated cyclic secondary amines such as 3-pyrroline, pyrrole, indole, carbazole, imidazole, pyrazole, or purine; cyclic polyamines containing secondary amino groups such as piperazine, pyrazine, or 1,4,7-triazacyclononane; unsubstituted or N-monosubstituted acid amides such as acetamide, propionamide, N-methylpropionamide, N-methylbenzoic acid amide, or N-ethylstearic acid amide; cyclic amides such as β-propiolactam, 2-pyrrolidone, δ-valerolactam, or ε-caprolactam; dicarboxylic acid imides such as succinimide, maleimide, or phthalimide.

The active hydrogen compounds having active hydrogen on sulfur atom are, for example, monothiols such as methanethiol, ethanethiol, n-butanethiol, t-butanethiol, hexanethiol, decanethiol, cyclopentylmercaptan, or cyclohexylmercaptan; polythiols such as 1,2-ethanedithiol, 1,3-propanedithiol, 2,3-butanedithiol, 1,6-hexanedithiol, 1,2,3-propanetrithiol, or 2,3-di(mercaptomethyl)-1,4-butanedithiol; aromatic mercapto compounds such as thiophenol, o-thiocresol, thionaphthol, or 1,2-benzenedithiol.

As further active hydrogen compounds there are poly (alkyleneoxides) having active hydrogen at the end of the molecule such as polyethyleneoxide or polypropyleneoxide; (co)poly{(meth)acrylates},(co)poly{(meth)acrylonitriles}, (co)poly(acrylamides), (co)poly(vinylpyridines), (co)Poly (N-substituted maleimides), (co)poly(vinylketones), or (co) poly(styrene derivatives) which have active hydrogen at the ends of the molecule and/or in the backbone chain, and furthermore, (co)polyesters, (co)polyamides, (co) polylactides, and (co)polysiloxane.

The active hydrogen compounds as described above act as chain transfer agent. Although the mechanism of the action is not necessarily clearly understood, it might be interpreted as follows: Since the equilibrium reaction proceeds reversibly and quite rapidly between new anions generated by the addition of organic oxyanions composing organic oxysalt compounds to polar unsaturated compounds and parts having active hydrogen atoms, the active hydrogen atoms are separated as protons from the parts having the active hydrogen atoms and are attracted toward the anions resulting in starting of polymerization also from the parts. The said active hydrogen compounds include chemical compounds having plural number of active hydrogen and whether the polymerization starts from all the parts having active hydrogen or from a part of them depends upon the degree of dissociation of the said active hydrogen, the reactivity of the attracted anion, the kind of the polar unsaturated compound, or the kind of the solvent applied.

The active hydrogen compound can be used alone or in combination of two or more of them simultaneously.

Among these active hydrogen compounds, preferable ones are monocarboxylates such as ethyl acetate, cyclohexyl propionate, isopropyl butyrate, methyl isobutyrate, t-butyl isobutyrate, hexyl caproate, butyl laurate, methyl stearate, ethyl oleate, methyl phenyl acetate, methyl cyclohexanecarboxylate, 1,2-bis(2-propylcarbonyloxy) ethane or 1,2,3-tris(2-propylcarbonyloxy)propane; polycarboxylates such as dimethyl malonate, dimethyl methylmalonate, diethyl succinate, butyl 2,3-dimethylsuccinate, methyl adipate, ethyl suberate, methyl butanetetracarboxylate, 1,2-bis(2-methoxycabonylethoxy) ethane, 1,2-bis(2-ethoxycarbonylpropoxy)ethane, 1,2-bis(2-ethoxycarbonylpropylmercapto)ethane, N,N,N',N'-tetrakis (2-butoxycarbonylpropyl)ethylenediamine; monoalcohols such as methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol, or cinnamyl alcohol, perfluoro-tert-butyl alcohol, α-hydroxyisopropylphenylketone, α-hydroxycyclohexylphenylketone, or methyl α-hydroxyisobutyrate; polyhydric alcohols such as, ethylene glycol, propylene glycol, diethylene glycol, dipropylene glycol, 1,3-propandiol, 1,3-butanediol, 1,4-butanediol, 1,6-hexanediol, 1,4-cyclohexanediol, trimethylolpropane, glycerin, diglycerin, pentaerythritol, or dipentaerythritol; monothiols such as methanethiol, ethanethiol, n-butanethiol, t-butanethiol, hexanethiol, decanethiol, cyclopentylmercaptan, or cyclohexylmercaptan; (co)poly(alkyleneoxide) having active hydrogen at the end and/or in the backbone chain, (co)poly{(meth)acrylates}, (co)poly{(meth)acrylonitriles}, (co)poly(acrylamides), (co)poly(vinylpyridines), (co)poly(N-substituted maleimides), (co)poly(vinylketones), or (co)poly(styrene derivatives).

The modes of the polymerization of the present invention are not particularly limited. Usually, after contacting hydroxyketone compound or a solution of the compound prepared by dissolving in suitable solvent, if necessary, with organic oxysalt compound, chain transfer agent to be used is added, and then polar unsaturated compound is contacted to polymerize it. If necessary, in a batch method of charging them together, the said unsaturated compound may also be charged intermittently or continuously. In case of obtaining copolymers, in accordance with the desired forms of copolymers the methods of charging plural number of these polar unsaturated compounds all together, intermittently, or continuously or the method of charging the plural number of polar unsaturated compounds in sequential order may be adopted. Quantity of the organic oxysalt compound to be used is not particularly restricted and usually $1 \times 10^{-7}$ to $1 \times 10^{-1}$ moles to 1 mole of the said polar unsaturated compound and preferably in the range of $1 \times 10^{-4}$ to $3 \times 10^{-1}$ moles. Quantity of the hydroxyketone compound to be used is usually 0.05 moles and more, preferably 0.5 to 1.50 moles, and more preferably 0.95 to 1.05 moles to 1 mole of the organic oxysalt compound. Quantity of the chain transfer agent, i.e., the active hydrogen compound varies. It depends on the molecular weight of the (co)polymer to be produced and usually $1 \times 10^{-6}$ to $5 \times 10^{-1}$ moles to 1 mole of the polar unsaturated compound and preferably in the range of $1 \times 10^{-4}$ to $2 \times 10^{-1}$ moles. The temperature of the polymerization varies. It depends upon the organic oxysalt compound, hydroxyketone compound, the chain transfer agent to be used, and the kinds and quantity of the said polar unsaturated compound. It is usually $-50°$ C. to $250°$ C., preferably in the range of $-20°$ C. to $150°$ C. The pressure of the polymerization varies. It depends on the kinds, quantity, and the reaction temperature, and is usually below 3.0 MPa (absolute pressure in mega pascal, the same in the following), preferably 0.01 to 1.5 MPa, more preferably 0.1 to 1.0 MPa.

The reaction time required for the polymerization depends on the organic oxysalt compound and the hydroxyketone compound which are used, the kinds and quantity of the chain transfer agent to be used and the said polar unsaturated compound. The reaction temperature is usually within 50 hours and preferably 0.1 to 24 hours.

Usually the said polar unsaturated compound contains a trace of a polymerization inhibitor, however in the method of the present invention the polymerization may be carried out in the presence of the polymerization inhibitor.

The polymerization in the method of the present invention may be carried out in a molten state of the said polar unsaturated compound. If necessary, suitable solvent may also be used. The polymerization may proceed in homogeneous solution or in suspension. The solvent is, for example, aliphatic or alicyclic hydrocarbon such as n-hexane, n-heptane, or cyclohexane; aromatic hydrocarbon such as benzene, toluene, or xylene; aromatic halogenated aromatic compound such as chlorobenzene or dichlorobenzene; ether such as diethyl ether, diphenylether, tetrahydrofuran, tetrahydropyran, 1,4-dioxane, ethylene glycol dimethyl ether, or diethylene glycol diethyl ether; aprotic polar solvent such as dimethylformamide, dimethyl sulfoxide, sulfolane, or N,N'-dimethylimidazolidinone. Any other solvents may be adopted as far as they do not hinder the methods of the present invention.

The cation, which formed organic oxysalt compound, remains at all or a part of a growth end of the product (co)polymer as counter ion when the polymerization is ended. For the purpose of separating out the (co)polymer stably, the polymerization may be terminated by adding inorganic acid such as hydrochloric acid, sulfuric acid, or phosphoric acid or organic acid such as acetic acid, propionic acid, benzenesulfonic acid, or paratoluenesulfonic acid and convert the said cation to the salt of inorganic or organic acid. The produced (co)polymer may be used, for the next purposes, as it is, or may be used for the next purposes, after the termination of the polymerization, by only solidifying the product by distilling out the solvent used, when necessary; however usually it is possible to separate out the (co)polymer by precipitating method of adding the reaction liquid itself or the solution wherein the dry solid is dissolved in suitable solvent to poor solvent. It is also possible to purify the (co)polymer by repeating the precipitating method.

The third invention obtained by the method of the present invention, that is, thermosetting powder coating composition made of the (co)polymer(A) obtained by the method of the present invention will be explained.

As (co)polymer(A), (co)polymer of one or more kinds of polar unsaturated compound containing epoxy group obtained by the method as described in any one of [1] to [12] or (co)polymer of the said polar unsaturated compound containing epoxy group and polar unsaturated compound is used.

As polar unsaturated compound containing epoxy group, any unsaturated compound may be used without particular limitation as far as it contains epoxy group and typical examples of the compound are polar unsaturated compound containing epoxy group such as glycidyl methacrylate, glycidyl acrylate, β-methylglycidyl methacrylate, β-methylglycidyl acrylate, acrylglycidyl ether and one kind or combination of two or more than two kinds of these compounds may be used.

As polar unsaturated compound which may be copolymerized with polar unsaturated compound containing epoxy group there is no particular limitation as far as polar unsaturated compound is concerned, and the typical examples of the compound are monomers of acrylates or methacrylates having alkyl or cyclohexyl group having 1 to 14 carbons, for example, acrylic acid derivatives or methacrylic acid derivatives including methyl-, ethyl-, n-propyl-, isopropyl-, n-butyl-, isobutyl-, n-amyl-, isoamyl-, n-hexyl-, cyclohexyl-, 2-ethylhexyl-, octyl-, 2-ethyloctyl-, decyl-, dodecyl-, and cyclohexyl-acrylates or methacrylates, and one kind or mixture and combination of two or more than two kinds of these compounds may be used.

As other specific examples of the polar unsaturated compound, there are other ethylenic unsaturated monomers, for example, aromatic vinyl compounds such as styrene, α-methylstyrene and vinyltoluene; dicarboxylates such as maleic acid and itaconic acid; unsaturated monomers of ethylene halides such as vinyl chloride, vinylidene chloride, vinyl fluoride, monochlorotrifluoroetylene, tetrafluoroethylene, chloroprene; nitriles such as acrylonitrile and methacrylonitrile; vinyl esters such as vinyl acetate and vinyl propionate; α-olefins such as ethylene, propylene, isoprene, butadiene, α-olefins having 4 to 20 carbon atoms; alkylvinyl ethers such as laurylvinyl ether; vinyl compounds containing nitrogen such as vinylpyrrolidone and 4-vinylpyrrolidone; one kind or mixture and combination of two or more than two kinds of these monomers may be used.

In the method of the present invention, content of the polar unsaturated compound containing epoxy group in the (co)polymer(A) is 15 to 100 mole %, preferably 20 to 60 mole % of the total monomers.

In the light of storage stability of the powder coating composition and surface flatness of the paint film caused by reduction in fluidity of the coating composition during the baking of the coatings, the glass transition temperature of the (co)polymer(A) is preferably 10 to 100° C., more preferably, 20 to 70° C. Better storage stability is obtained when the glass transition temperature is above 10° C. and preferable melt viscosity is obtained resulting in better external appearance of paint film when it is below 100° C.

In the present invention the glass transition temperature is measured using robot DSC RDC220 (Seikou Denshi Kougyou's product) at 10° C./min. from −20 to 120° C. The definition of the glass transition temperature is described in page 131 of Koubunshi Jiten (Koubunshi Gakkai Henshuu, Asakura Shoten Hakkou, Shouwa 46 Nen Shohan)

As the curing agent composition component (B), which can cure the (co)polymer(A) as described above, to be used for the thermosetting powder coating composition of the present invention, the compounds which can cure the (co) polymer(A) by reacting with the functional groups in the (co)polymer(A) are used. However when the said functional group is epoxy, at least one kind of compound selected from the group consisting of polycarboxylic acid and/or polycarboxylic acid anhydride is preferable. The compound is the component of the composition of curing agent which reacts with the epoxy groups existing in the molecule of the composition of resin to be used for the powder coatings of the present invention.

As the compound of polycarboxylic acid any aliphatic, aromatic, and alicyclic compound may be used. Specific examples of the aromatic polycarboxylic acids are isophthalic acid and trimellitic acid and these acids may be used as single or the combination of them. Specific examples of the alicyclic polycarboxylic acids are hexahydrophthalic acid and tetrahydrophthalic acid and these acids may be used as single or the combination of them. Polyester resin having carboxyl group may be used also. However, in the present invention the compound of aliphatic polycarboxylic acid is preferably used in the light of the paint film property such as the surface flatness and the weather resistance.

There is no particular limitation regarding the aliphatic polycarboxylic acid (b-1) as far as it is aliphatic compound having substantially at least 2 carboxylic groups in the molecule and one or more than one kinds of the aliphatic compound may be used.

Specific examples of the aliphatic polycarboxylic acid (b-1) are aliphatic dicarboxylic acid. As specific examples of the aliphatic dicarboxylic acid are those having carbon number of around 4 to 24 such as succinic acid, glutaric acid, adipic acid, pimelic acid, suberic acid, azelaic acid, sebacic acid, undecanedioic acid, dodecanedioic acid, brassidic acid, octadecanedioic acid, and eicosanedioic acid, and the dodecanedioic acid is preferable among them and these acids are used singly or in combination of them.

The polycarboxylic acid anhydride (b-2) in the present invention is not particularly limited as far as the acid anhydride is a compound which contain aliphatic acid anhydrides of linear oligomer of more than dimmers or polymers substantially having or not having carboxyl groups in the molecule and have at least 2 carboxyl groups and/or acid anhydride groups existing substantially in the molecules, and one or more than one kinds of the polycarboxylic acid anhydrides may be used. An example of the polycarboxylic acid anhydride is a dehydration condensation product of the polycarboxylic acid (b-1). Among them linear condensed anhydride of dodecandioic acid is preferable and its typical example is Additol XVL1381 (Sorushia's product). The polycarboxylic acid anhydride (b-2) is preferably prepared so that the melting point is in the range of 40 to 150° C.

In the method of the present invention various additives can be added which are usually added to coatings. The external appearance or the paint film property may also be improved by adequate blending synthetic resin composition containing epoxy resin, polyester resin, or polyamide, natural resin or semi-synthetic resin composition containing cellulose or cellulose derivatives with the thermosetting powder coating composition of the present invention depending on the purpose of use.

Additives such as curing catalyst, pigment, fluidity adjusting agent, thixotropy agent (thixotropy adjusting agent), antistatic agent, surface adjusting agent, luster agent, blocking preventing agent, plasticizer, ultraviolet absorbing agent, blowing preventing agent, and slip agent may be adequately blended with the thermosetting powder coating composition of the present invention depending on the purpose of use. In the case of using as clear coat, coloring may be operated by blending a small amount of pigment so that complete hiding property does not occur.

When composition containing (co)polymer(A) and component (B) are kneaded mechanically, the mixing temperature is not limited particularly as far as substantially homogeneous composition of the powder coating can be prepared. Heating roller, heating kneader, or extruder is usually used as apparatus for kneading by melting.

As a specific example of the methods for blending the composition of the thermosetting powder coating composition of the present invention, a method of adequate combination of kneader and blender such as roller, kneading machine, mixer (Banbury type and Transfer type), calendar, or extruder for sufficiently homogeneous mixing at each process condition adequately chosen (temperature, melting or nonmelting, r.p.m., vacuum atmosphere, and inert atmosphere) may be adopted, and then, a method of obtaining homogeneous fine powders of the compositions of powder coatings by pulverizers may be adopted, however these methods are not particularly limited and there may be other methods than those as described above.

Block of the coating composition obtained by the blending is cooled down, and then is pulverized so that the mean particle diameter becomes 10 to 90 $\mu$m. As pulverizers hammer mills are used.

The thermosetting powder coating composition obtained by the pulverization is adhered to the surface of the objects to be coated by a method of electrostatic coating or fluidized bed one and paint film is formed by thermosetting the composition by heating. In case of the process of baking the thermosetting powder coating composition of the present invention, it is possible to carry out crosslinking reaction between the (co)polymer(A) and the curing agent composition component (B) usually at a temperature of about 100° C. to 180° C., more preferably, about 120° C. to 160° C., normally for about 10 min. to 60 min. After the baking process, paint film having excellent property is obtained by cooling to the room temperature.

When the thermosetting powder coating composition of the present invention is used as top coating and not only conventional type coatings but also water borne coatings are used as under coating, the paint film of the coating composition of the present invention after the baking process has as excellent property as in case of using solvent type coatings.

That is, after under coatings (including those containing pigments and/or metal powders) are painted and dried for certain hours, in accordance with the method as described above the thermosetting powder coating composition of the present invention is adhered to the surface of the under coatings and the paint film is formed by thermosetting the composition by heating.

The painting method of the thermosetting powder coating composition related to the present invention are applied to automobile bodies or parts of the automobiles (aluminum wheel, windshield wiper, or center pillar).

The paint film formed by an appropriate or public known or public use painting method has excellent property with regard to storage stability (blocking resistance), external appearance (surface flatness, brightness, and transparency), physical property (hardness, scratch resistance, and adhesion property of top coating), and chemical property (weather resistance, acid resistance, and solvent resistance).

EXAMPLE

The present invention is explained by the following examples in more detail, however these examples are not limiting and should be interpreted only as for explanation.

Example 1

After a 300 ml flask equipped with a stirrer, a dropping funnel, and a tube for temperature measurement was dried sufficiently, 2-hydroxy-2,4,4-trimethyl-3-pentanone (169 mg, 1.17 mmol) was weighed accurately and transferred into the flask, and a tetrahydrofuran (abbreviated as THF hereinafter) solution (11.7 ml, 1.17 mmol) containing tetraphenylphosphoniummethoxide (0.10 M) was added to it and stirred to obtain a homogeneous solution. N-butanol (87 mg, 1.17 mmol) as a chain transfer agent was added to the solution and further a THF solution (176 ml, containing MMA 35.1 g 351 mmol) of methyl methacrylate (abbreviated as MMA)(2.00 M) was dropped so that the reaction temperature did not exceed 50° C. It took about 30 min. to drop the solution. After the dropping was completed, the solution was stirred for 3 hours and then a THF solution (2.00 ml, 2.00 mmol) of acetic acid (1.0 M) was added and the reaction was stopped. A small amount of the reaction mixture was taken and quantitative analysis was carried out by gas chromatography using 1,3,5-trichlorobenzene as an internal standard. As a result of the analysis, the methyl methacrylate and the n-butanol were completely consumed. The remaining reaction mixture except for 0.5 ml to be used for GPC analysis was poured into methanol (about 2 L). Precipitated solid was separated by filtration and washed 3 times with methanol (40 ml). The obtained solid was dried for 6 hours at 50° C. under 10 mmHg and odorless solid (34.2 g) was obtained. $^1$H-NMR and $^{13}$C-NMR spectrum of the solid was almost identical with the poly(methyl methacrylate) of Aldrich Company's product. A solution was prepared so that the concentration of the poly(methyl methacrylate) became about 0.5 wt % by diluting the remaining reaction mixture (0.5 ml) with THF and GPC analysis with standard polymer of poly(methyl methacrylate) was carried out by means of GPC column (Product of Showa Denkou Co., connected with 2 columns shodex-KF-803L and shodex-KF-804L) and using THF as developing solvent. As a result of the analysis, the number average molecular weight of the obtained poly(methyl methacrylate) was 14,800, while the theoretical number average molecular weight was 15,100 which was calculated from the calculating formula(2) of the present invention and these two figures are quite similar. Furthermore, the molecular weight distribution index ($M_w/M_n$) was 1.11, i.e., the distribution is quite narrow, therefore the polymer was found to be monodispersive. The result obtained means that two polymer molecules having similar number average molecular weight were produced per one molecule of catalyst component.

Examples 2–6

For the purpose of further confirming the property of catalytic living polymerization of MMA, the same polymerizations as in Example 1 were carried out except for changing the amounts of the chain transfer agent n-butanol. In every case, n-butanol and MMA were completely consumed. The results of GPC analysis of the obtained poly(methyl methacrylates) are shown in Table 1 with that of Example 1. The number average molecular weights of polymers obtained in each Example are quite agreeable with those of the theoretical number average molecular weights. The deviation from the theoretical number average molecular weights was within 3% of the theoretical ones. Furthermore, the molecular weight distribution indexes of the polymers obtained were 1.06–1.18 which means the polymers were monodispersive ones. The series of these results indicate strongly that polymerization of MMA using organic oxysalt compounds as catalysts in the presence of hydroxycarbonyl compounds having at least both alcoholic hydroxyl groups and carbonyl groups in the same molecules proceeds by the catalytic living polymerization.

Comparative Example 1

The same polymerization as in Example 1 was carried out except for not using 2-hydroxy-2,4,4-trimethyl-3-pentanone. The consumption rates of n-butanol and MMA were 78% and 100%, respectively. The obtained polymer was the mixture of the polymers having number average molecular weights of 41,600 and 8,000 and the molecular weight distribution index was 4.61. This result and the result obtained in the Example 1 indicate that hydroxyketone compound plays a very important role in the control of the polymerization.

TABLE 1

| Example | Amount of n-butanol used mmol | Theoretical Mn | Results of GPC Analysis Mn | Mw/Mn |
|---|---|---|---|---|
| 1 | 1.17 | 15,100 | 14,800 | 1.11 |
| 2 | 2.34 | 10,100 | 9,900 | 1.18 |
| 3 | 4.68 | 6,070 | 6,010 | 1.16 |
| 4 | 10.5 | 3,080 | 2,990 | 1.09 |
| 5 | 22.2 | 1,570 | 1,600 | 1.09 |
| 6 | 23.9 | 1,100 | 1,070 | 1.06 |

Note:
Mn indicates number average molecular weight, Mw/Mn indicates molecular weight distribution.

Application Example

"Part" and "%" in the following explanation are the values based on mass, if not described otherwise.

[Preparation of Painting Plates]

White coating material of acrylic-melamine crosslinking was painted with thickness of 20 μm on a bonderite steel plate having thickness of 0.8 mm which has already been treated with zinc phosphate. The steel plate was then baked at 140° C. for 30 min and substrate coated steel plate was prepared.

[Performance Evaluation]

The performance evaluation was made according to the following methods:

1̂ Blocking Resistance Test of Powder Coating Composition

After storing powder coating composition (6.0 g) for 7 days at 23° C. in a cylindrical container having 20 mm inner diameter, the powder coating composition was taken out and the degree of blocking of the powder coating composition was evaluated according to ⊚, ○, and X by eye-observation and contact with fingers.

⊚: quite normal

○: poor a little bit

X: poor

2̂ External Appearance by Eye-Observation (Surface Flatness, Brightness)

External appearances of paint film was evaluated by eye-observation according to ⊚, ○, and X.

⊚: particularly excellent

○: good

X: poor

3̂ Long Wave(Lw)

Lw was measured by Wave-scan-plus (BYK company's product). The Lw is an index indicating the surface flatness of paint film.The less the index value is, the more smooth the surface is.

4̂ Luster

Measured values by a glossmeter (60° gloss) were indicated.

5̂ Transparency

Color difference(ΔE) between the paint films to be measured and those of substrate coating was measured by a Color guide (BYK company's product).

⊚: −0.5<ΔE<0.5

X : ΔE≦−0.5 or 0.5≦ΔE

6̂ Hardness Test of the Paint Films

The pencil hardness test (based on Japanese Industrial Standards: JIS K5400 6.14) was applied to evaluate the hardness. The indication was expressed by pencil hardness symbols.

7̂ Scratch Resistance

Scratching test of rubbing the surface of the paint film by a brush using a 3% solution of abrasive compound suspension was carried out and luster retention rate was calculated by the evaluation of luster (20° gloss) before and after the rubbing.

Luster retention rate=(20° gloss after the test)/(200 gloss before the test)×100

The luster retention rate was evaluated according to ⊚, ○, and X.

⊚: 60% and more

○: 40% and more, less than 60%

X: less than 40%

8̂ Recoating Property

The test of the recoating property was carried out by the cross-cut adhesion test based on JIS K5400 8.5.2. The number of unpeeled parts was evaluated according to ⊚, ○, and X.

⊚: 100

○: 80 and more, less than 99

X: less than 80

9̂ Acid Resistance

A 10 vol. % solution of sulfuric acid was dropped on the surface of the paint film and it was left alone at room temperature for one day. Then, the sulfuric acid solution was wiped off and the surface was evaluated according to ⊚, ○, and X by observation of external appearance.

⊚: No scars were found.

○: Very few scars were observed.

X: Scars were observed.

10 Solvent Resistance

After rubbing the surface of paint film with a gauze impregnated with xylol for 50 times of reciprocation, the surface was evaluated by observation according to ⊚, ○, and X.

⊚: No scars were found.

○: Very few scars were observed.

X: Scars were observed.

11 Weatherability Test

Acceleration test was carried out according to QSWOM for 2000 hours and luster of the paint film before and after the test was measured and the retention rate of luster(%) was calculated by the following formula:

Retention rate of luster=(20° gloss after the acceleration test)/(20° gloss before the acceleration test)×100

[Polymer (A) Production Example 1]

The (co)polymer (A) of the present invention was evaluated as coating resin.

Example 7 (Production Example 1)

After a 10 L flask equipped with a stirrer, a dropping funnel ,and a tube for temperature measurement was dried sufficiently, hydroxyketone compound, i.e., 1-hydroxycyclohexylphenylketone (5.37 g, 26.3 mmol) and oxysalt compound, i.e., potassium salt of diethyl methylmalonate (5.33 g, 25.1 mmol) were weighed accurately under nitrogen atmosphere at room temperature and transferred into the flask. THF (1400 ml) was added to them and stirred to obtain a homogeneous solution. Methyl isobutyrate (12.8 g, 126 nimol) as chain transfer agent was added to the solution. Then, the solution was cooled with ice. To the solution was dropped a 1256 ml THF solution wherein MMA (1.00 M), n-butyl methacrylate (hereinafter abbreviated as n-BMA,0.1 M), isobutyl methacrylate (hereinafter abbreviated as i-BMA, 0.1 M) and glycidyl methacrylate (hereinafter abbreviated as GMA, 0.8 M) are contained respectively (containing 126 g:1.26 mol MMA, 17:9 g:126 mmol n-BMA, 17.9 g:126 mmol i-BMA, 143 g:1.00 mmol GMA) so that the reaction temperature did not exceed 10° C. The time required for the dropping was about 2 hours. After the dropping was completed, the solution was stirred for further 5 hours at room temperature and then, the reaction was stopped by adding THF solution (46.5 ml, 46.5 mmol) of 1.0 M acetic acid. All of the monomers had been consumed completely. Aluminum silicate (25.6 g) was added to the reaction mixture and the mixture was stirred for 2 hours at room temperature and filtered. The mother liquor was concentrated to solidify it and the obtained solid was dried at 50° C. under 10 mmHg for 24 hours. 297 g of colorless and odorless solid was obtained. The glass transition temperature of the solid was 35° C. and the number average molecular weight of the obtained copolymer was 2,410 while its theoretical number average molecular weight was 2,138 and its molecular weight distribution index was 1.34

[Related Comparative Production Example of (co)polymer (A)]

A flask having 4 inlets equipped with a stirrer, a thermometer, a reflux condenser, and an inlet for introducing nitrogen was charged with 66.7 parts of xylene and heated to the temperature of refluxing. Polar unsaturated compound (parts) and t-butylperoxy 2-ethylhexanoate (PB-O: Nihon Yushi's product) as polymerization initiator as indicated in Table 2 were dissolve in the xylene and the mixed solution was dropped during 5 hours and was kept at 100° C. for 5 hours thereafter. Polymers (Comparative Production Examples 1, 2, and 3) were obtained by removing the solvent of the polymer solution which had been produced. The characteristics of the copolymers obtained are also indicated in the Table 2.

TABLE 2

Production Example 1 and Comparative Production Examples 1, 2 and 3

|  | Production Example 1 | Comparative Production Example 1 | Comparative Production Example 2 | Comparative Production Example 3 |
|---|---|---|---|---|
| Methyl methacrylate | 50 | 50 | 35 | 35 |
| n-butyl methacrylate | 5 | 5 | 5 | 5 |
| Isobutyl methacrylate | 5 | 5 | 5 | 5 |
| Glycidyl methacrylate | 40 | 40 | 40 | 40 |
| Styrene | — | — | 15 | 15 |
| PB-O *1 | — | 10 | 8 | 13 |
| Number average molecular weight (Mn) | 2410 | 2480 | 2300 | 1720 |
| Weight average molecular weight (Mw) | 3220 | 5780 | 5150 | 3510 |
| Molecular weight distribution (Mw/Mn) | 1.34 | 2.33 | 2.24 | 2.04 |
| Glass transition temperature (° C.) | 35 | 35 | 35 | 20 |

*1: t-butylperoxy 2-ethylhexanoate (Nihon Yushi's product)

Application Examples 1 and 2

Weight ratios (parts) indicated in Table 2 of polymer(A) (Production Example 1) and curing agent composition component(B) were blended and 1.5 parts of CGL1545 Ciba Geigy Company's product, ultraviolet absorbing agent), 1.5 parts of Chinubin 144 Ciba Geigy Company's product, light stabilizer), 0.2 parts of benzoin (blowing preventing agent), 0.5 parts of ethylenebisstearamide (blowing preventing agent and slip agent), and 1.0 part of Resimix RL-4 (fluidity adjusting agent) were added to the total 100 weight parts of (A) and (B), and after the mixture as described above was kneaded in molten state in a kneading machine and cooled, it was pulverized by a pulverizer and powder coating was obtained. After the produced powder coating was painted on the substrate coated steel plate by the electrostatic spray so that the paint film thickness became 40 μm, test plate for adhesion test of the top coating was obtained by heating the steel plate at 150° C. for 30 min.

[Application Comparative Example 1, 2, 3, and 4]

Except that Application Comparative Polymer ((A) Application Comparative Production Examples 1, 2, and 3) and (B) were blended in the ratio as indicated in Table 3, test plate was obtained according to the same method as in the Application Example 1.

Evaluation results of Application Examples and Comparative Examples

Evaluation results of the powder coatings and the paint films formed in Application Examples 1 and 2 are shown in Tables 3 and 4. Evaluation results of the powder coatings and the paint films formed in Application Comparative Examples 1, 2, 3, and 4 relating to the Application Examples 1 and 2 are also shown in Tables 3 and 4. The powder coatings compositions of the Examples as indicated in Table 4 are within the scope of the present invention and the results shown in the table indicate that the compositions of the present invention are the thermosetting powder coatings compositions which can provides the paint films having external appearance (surface flatness, brightness, and transparency), physical property (hardness, scratch resistance, and recoating property), and chemical property (weather resistance, acid resistance, and solvent resistance) without lowering the storage stability (blocking resistance) as compared to the conventional powder coatings.

TABLE 3

Coating compositions of Application Examples 1,2 and Application Comparative Examples 1,2,3, and 4

|  |  | Application Example 1 | Application Example 2 | Application Comparative Example 1 | Application Comparative Example 2 | Application Comparative Example 3 | Application Comparative Example 4 |
|---|---|---|---|---|---|---|---|
| Polymer(A) | Production Example 1 | 76.8 | 68.8 |  |  |  |  |
| Comparative Polymer | Comparative Porduction Example 1 |  |  | 76.8 |  |  |  |
|  | Comparative Production Example 2 |  |  |  | 76.8 | 68.8 | 68.8 |

TABLE 3-continued

Coating compositions of Application Examples 1,2 and Application Comparative Examples 1,2,3, and 4

|  |  | Application Example 1 | Application Example 2 | Application Comparative Example 1 | Application Comparative Example 2 | Application Comparative Example 3 | Application Comparative Example 4 |
|---|---|---|---|---|---|---|---|
| Hardening agent (B) | Dodecanedioic acid | 23.2 |  | 23.2 | 23.2 |  |  |
|  | VXL1381*2 |  | 31.2 |  |  | 31.2 | 31.2 |

*2: Polycarboxylic acid anhydride hardening agent Additol XVL1381 (Sorushia Company's product)

TABLE 4

Evaluation Results of Application Examples and Application Comparative Examples

|  | Application Example 1 | Application Example 2 | Application Comparative Example 1 | Application Comparative Example 2 | Application Comparative Example 3 | Application Comparative Example 4 |
|---|---|---|---|---|---|---|
| Blocking resistance | ⊚ | ⊚ | ○ | ○ | ○ | X |
| Visual external appearance | ⊚ | ⊚ | X | X | X | ○ |
| Long wave | 3.4 | 1.9 | 10.1 | 12.1 | 8.9 | 5.4 |
| Luster (60° gloss) | 91 | 91 | 91 | 92 | 92 | 92 |
| Transparency | ⊚ | ⊚ | ⊚ | ⊚ | ⊚ | ⊚ |
| Paint film hardness | H | H | H | H | H | B |
| Scratch resistance | ⊚ | ⊚ | ⊚ | ⊚ | ⊚ | X |
| Recoating property | ⊚ | ⊚ | ⊚ | ⊚ | ⊚ | ⊚ |
| Acid resistance | ⊚ | ⊚ | ⊚ | ⊚ | ⊚ | ○ |
| Solvent resistance | ⊚ | ⊚ | ⊚ | ⊚ | ⊚ | X |
| Weather resistance | 95 | 95 | 95 | 93 | 93 | 66 |

INDUSTRIAL APPLICABILITY

According to the methods of the present invention, by using hydroxycarbonyl compounds with inexpensive organic oxysalt compound which has not any particular problem at handling, it is possible to improve to a great extent the polymerization performance of the said organic oxysalt compound to polar unsaturated compound. Furthermore, by polymerization of polar unsaturated compounds using organic oxysalt compound as catalyst in the presence of hydroxycarbonyl compound having at least both an alcoholic hydroxyl group and a carbonyl group in the same molecule, it is possible to produce quite effectively polymers whose number average molecular weight and number of produced molecules are controlled very accurately.

The present invention relates to the thermosetting powder coating composition (for example, acrylic thermosetting powder coating composition) having storage stability, external appearance property, physical property, and chemical property, which have not been achieved yet by the prior arts, and particularly provide thermosetting powder coating composition (for example acrylic thermosetting powder coating composition) which is particularly applied preferably to the painting, more particularly, to the painting of top coating of automobile bodies and parts for vehicles such as automobiles (aluminum wheel, windshield wiper, pillar, door handle, fender, bonnet, air spoiler, stabilizer, and front grill).

What is claimed is:

1. A method of producing a living polymerized (co) polymer which method comprises polymerization of polar unsaturated compound in the presence of a hydroxycarbonyl compound having at least both an alcoholic hydroxyl group and a carbonyl group in the same molecule using an organic oxysalt compound as catalyst.

2. The method as claimed in claim 1, wherein a cation forming the organic oxysalt compound is an alkali metal cation, a tetraalkylammonium cation, a trialkylsulfonium cation, a tetraarylphosphonium cation, a hexaarylphosphoranilidene ammonium cation, or a tetrakis{tris (dialkylamino)phosphoranilideneamino}phosphonium cation.

3. The method as claimed in claim 1, wherein a cation forming the organic oxysalt compound is a tetraalkylammonium cation, a tetraarylphosphonium cation, or a hexaarylphosphoranilidene animonium cation.

4. The method as claimed in claim 1, wherein an anion forming the organic oxysalt compound is an organic oxyanion derived from a monohydric alcohol, an organic oxyanion derived from a monocarboxylate, or an organic oxyanion derived from a polycarboxylate.

5. The method as claimed in claim 1, wherein an anion forming the organic oxysalt compound is an organic oxyanion derived from a monohydric alcohol.

6. The method as claimed in claim 1, wherein the hydroxycarbonyl compound is an α-hydroxyketone or an α-hydroxycarboxylate.

7. The method as claimed in claim 1, wherein the polar unsaturated compound is a chemical compound having both a polar functional group selected from carbonyl, cyano, or pyridyl groups, and an unsaturated group in the same molecule and, in addition, the functional group and the unsaturated group form a directly or indirectly conjugated system.

8. The method as claimed in claim 1, wherein the polar unsaturated compound is a (meth)acrylate, a (meth) acrylonitrile, a (meth)acrylamide, a vinylpyridine, a N-substituted maleimide, a vinylketone, or a styrene derivative.

9. The method as claimed in claim 1, wherein the polar unsaturated compound is a monoester formed by esterification between a monohydric alcohol and acrylic acid or methacrylic acid, a monoester formed by esterification between acrylic acid or methacrylic acid and a dihydric alcohol one end of which is protected by ether linkage, a polyester formed by esterification between acrylic acid or methacrylic acid and all of the hydroxyl groups of the polyhydric alcohol having two or more hydroxyl groups, an acrylonitrile, a methacrylonitrile, a N,N-disubstituted mono (meth)acrylamide, a pyridine substituted by vinyl or isopropenyl group, a N-aromatic substituted maleimide or a vinylketone.

10. The method as claimed in claim 1, wherein an active hydrogen compound is used as a chain transfer agent.

11. The method as claimed in claim 1, wherein the reaction is conducted in presence of a chain transfer agent which is a monocarboxylate, a polycarboxylate, a monohydric alcohol, a polyhydric alcohol, a monothiol, a (co)poly (alkyleneoxide) having an active hydrogen at its end and/or in its backbone chain, a (co)poly{(meth)acrylate}, a (co)poly{(meth)acrylonitrile}, a (co)poly(acrylamide), a (co)poly(vinylpyridine), a (co)poly(N-substituted maleimide), a(co)poly(vinylketone), or a (co)poly(styrene derivative).

12. The method as claimed in claim 1, wherein a copolymer is produced by using at least two or more of the polar unsaturated compounds together.

13. A thermosetting powder coating composition comprising;

a living polymerized (co)polymer (A) obtained by the method as claimed in claim 1, and a curing agent composition component (B) which can cure said (co)polymer.

14. The thermosetting powder coating composition as claimed in claim 13, wherein the (co)polymer(A) comprises an epoxy group.

15. The thermosetting powder coating composition as claimed in claim 13, wherein the (co)polymer(A) has a glass transition temperature of 10° C.–100° C.

16. The thermosetting powder coating composition as claimed claim 13, wherein the curing agent composition component (B) which can cure the (co)polymer comprising;

(b-1) a polycarboxylic acid and/or (b-2) a polycarboxylic acid anhydride.

17. The thermosetting powder coating composition as claimed in claim 13, wherein the thermosetting powder coating composition is for use as top coating of automobiles.

* * * * *